United States Patent
Daouk

(10) Patent No.: US 8,801,347 B2
(45) Date of Patent: Aug. 12, 2014

(54) COUPLING DEVICE WITH ADJUSTMENT PLATE

(76) Inventor: Antar Daouk, Paris (FR)

( * ) Notice: Subject to any disclaimer, the term of this patent is extended or adjusted under 35 U.S.C. 154(b) by 528 days.

(21) Appl. No.: 12/989,060

(22) PCT Filed: Apr. 24, 2009

(86) PCT No.: PCT/FR2009/050762
§ 371 (c)(1),
(2), (4) Date: Jan. 4, 2011

(87) PCT Pub. No.: WO2009/138673
PCT Pub. Date: Nov. 19, 2009

(65) Prior Publication Data
US 2011/0089210 A1 Apr. 21, 2011

(30) Foreign Application Priority Data
Apr. 24, 2008 (FR) ...................................... 08 02288

(51) Int. Cl.
*B60P 7/08* (2006.01)
(52) U.S. Cl.
USPC .......................................... 410/105; 410/106
(58) Field of Classification Search
USPC ............... 410/104, 105, 106, 116; 244/118.1, 244/118.6, 137.1; 248/500, 503.1
See application file for complete search history.

(56) References Cited

U.S. PATENT DOCUMENTS

| 4,062,298 A | 12/1977 | Weik |
| 4,185,799 A | 1/1980 | Richards, Jr. |
| 4,496,271 A | 1/1985 | Spinosa et al. |
| 4,509,888 A * | 4/1985 | Sheek ........................... 410/105 |
| 2005/0072897 A1 | 4/2005 | Fanucci et al. |

FOREIGN PATENT DOCUMENTS

GB 2406877 B 10/2006

OTHER PUBLICATIONS

International Search Report issued by the International Searching Authority (ISA/EPO) on Dec. 4, 2009 in connection with International Application No. PCT/FR2009/050762.
Written Opinion of the International Searching Authority issued by the International Searching Authority (ISA/EPO) in connection with International International Searching Authority (ISA/EPO) in connection with International Application No. PCT/FR2009/050762 with English translation.
International Preliminary Report on Patentability and Written Opinion of the International Searching Authority, issued by the International Searching Authority (ISA/EPO/ on Dec. 18, 2010 in connection with International Application No. PCT/FR2009/050762 with English translation of the Written Opinion.

* cited by examiner

*Primary Examiner* — Stephen Gordon
(74) *Attorney, Agent, or Firm* — John P. White; Cooper & Dunham LLP

(57) ABSTRACT

The invention relates to a device (1) for coupling equipment to a rail in a vehicle. The coupling device (1) includes both a main body (2) designed to be attached to the rail, and a connecting member (3) attached to the main body (2) and designed to be connected to the equipment. The coupling device (1) is characterized in that the connecting member (3) includes, as a minimum, both a first plate (4) mounted movably on the main body (2), and a first adjustment member (8) designed to allow a user to adjust, by manipulating the first adjustment member (8), the position of the first plate (4) relative to the main body (2).

18 Claims, 4 Drawing Sheets

COUPLING DEVICE WITH ADJUSTMENT PLATE

This application is a §371 national stage of PCT International Application No. PCT/FR2009/050762, filed Apr. 24, 2009, claiming priority of French Patent Application No. 0802288, filed Apr. 24, 2008, the contents of all of which are hereby incorporated by reference into this application.

TECHNICAL FIELD

The present invention relates to the general technical field of coupling devices for removably attaching an equipment to a rail, which itself installed on board a vehicle. In particular, the present invention relates to the field of fast coupling of equipments (such as seats, on-board galley elements, etc.) to rails fixed in aircrafts such as helicopters or planes.

More particularly, the present invention relates to a device for coupling an equipment to a rail installed on board a vehicle, said device comprising, on the one hand, a main body designed to be attached to the rail, and on the other hand, a connecting member attached to the main body and designed to be connected to said equipment.

PRIOR ART

It is known to equip aircrafts with rails permitting to reversibly and fastly attach on-board equipments, such as seats, nacelles, galley or lavatory elements, etc. Generally, aircrafts are equipped with at least two parallel rails so that a same on-board equipment can be attached simultaneously to each rail, to obtain a perfectly stable and rigid fixation. In particular, heavy and bulk on-board equipments need to be fixed according to a fixation polygon, and for example according to a fixation quadrilateral having two fixation points located on the first rail and two other fixation points located on the second rail, which is parallel to the first one, the four fixation points forming, in the plane of longitudinal extension of said rails, a rectangle. Each fixation point is made using a fast coupling device which forms a fixation interface between the on-board equipment to be installed and the rail.

Such a fast coupling device is well known in this technical field, and can be, for example, in the form described in the document FR-2 912 993. Such a device (often referred to as a "fixation stand" in the technical field) thus comprises, on the one hand, a plate for attachment of the on-board equipment, which is secured to the latter by a rigid connection, for example by screwing, and on the other hand, an anchoring means for the fast and reversible fixation of the coupling device to the rail.

An example of installation of an on-board equipment, in this case a generally parallelepipedal galley element, will now be succinctly exposed in the following.

Said galley element comprises a generally rectangular back face, to the four corners of which are respectively screwed four coupling devices according to the above description. The person in charge of installing this galley element lifts up the galley element and positions it on the rails, so that two fixation stands rest on a first rail, whereas the two other stands rest on the other rail. The person then operates the anchoring means of each stand, for securing each of the four stands to the corresponding rail and then obtaining a rigid and stable fixation of the galley element to the floor of the aircraft cabin.

After the operation of fixing the stands to the rails is performed, it is frequent to notice level and parallax defects of the fixation polygon, whose apexes correspond to the four fixation stands. In other words, instead of the desired rectangular shape, the fixation polygon may have a deformed contour, for example of trapezoidal shape. In the vertical direction, differences of fixation level (i.e. altitude) may be noticed from a stand to another, so that the galley element is in this case abnormally tilted.

Those parallax and level defects result in permanent mechanical stresses that threaten the integrity of the galley element, because they can lead, potentially due to mechanical fatigue phenomena, to a deterioration of the element.

Those parallax and level defects also generate deformations of the galley element structure, such deformations being potentially harmful for the functionality and/or the integrity of said element.

DESCRIPTION OF THE INVENTION

Accordingly, the objects assigned to the invention are to remedy the various above-mentioned drawbacks of the prior art and to propose a new device for coupling an equipment to a rail installed on board a vehicle, allowing a user to correct, in a particularly simple, fast (without successive assembling/disassembling operations) and reliable way, a potentially bad position of the equipment relative to the rail.

Another object of the invention is to propose a new device for coupling an equipment to a rail installed on board a vehicle, the construction of which is particularly simple, cheap and robust.

Another object of the invention is to propose a new device for coupling an equipment to a rail installed on board a vehicle, allowing the user to adjust without effort, even when the equipment weight is significant, and in a simple and precise way, the position of the equipment relative to the rail.

Another object of the invention is to propose a new device for coupling an equipment to a rail installed on board in a vehicle, allowing an excellent holding of the equipment in position, even when the rail is installed on board an aircraft.

Another object of the invention is to propose a new device for coupling an equipment to a rail installed on board in a vehicle, implementing a particularly simple and cost-economic design, with a minimum of parts.

Another object of the invention is to propose a new device for coupling an equipment to a rail installed on board in a vehicle, allowing a fine, precise and intuitive position adjustment of the equipment.

Another object of the invention is to propose a new device for coupling an equipment to a rail installed on board in a vehicle, allowing an efficient and fast correction of any level and/or parallax defect of the equipment.

The objects assigned to the invention are achieved by means of a device for coupling an equipment to a rail installed on board a vehicle, said device comprising, on the one hand, a main body designed to be attached to the rail, and on the other hand, a connecting member attached to the main body and designed to be connected to said equipment, said device being characterized in that the connecting member comprises at least, on the one hand, a first plate movably mounted on the main body, and on the other hand, a first adjustment means designed to adjust, through a manipulation of the first adjustment means by a user, the position of the first plate relative to the main body.

BRIEF DESCRIPTION OF THE DRAWINGS

Other objects and advantages of the invention will become more fully apparent from the following description, taken in conjunction with the appended drawings, given only by way of illustrative and non limitative example, and in which.

BEST WAY OF MAKING THE INVENTION

In the following, the invention will be described in reference with two embodiments corresponding to FIGS. 1-7 and to FIG. 8, respectively. Similar reference numbers are used to denote functionally equivalent parts in each of the embodiments.

The invention relates to a device 1 for coupling an equipment (not illustrated) to a rail (not illustrated), said rail being installed on board a vehicle (not illustrated).

Preferentially, the device 1 is a device for coupling an equipment to a rail installed on board an aircraft, such as a plane or a helicopter for example. Hereinafter, for reasons of clarity and shortness of description, it will be referred only to a device 1 designed specifically to be coupled to a rail installed on board an aircraft, it being understood that the invention is not limited to this preferential aeronautical application and may also be used in a land or sea vehicle. Preferably, the device 1 is a fast coupling device, allowing a user to manually couple and uncouple at will the device 1, using only his physical force. Preferably, the user can perform the coupling and uncoupling operations without any tool, by directly manipulating operating members integrated to the stand. The device 1 is thus, in this preferential case, a self-coupling device. Preferably, the rail with which the coupling device 1 is intended to be coupled is an aeronautical type rail, provided with an alveolar central slot, as described for example in the document FR 2 912 993. Such a rail design is well know and the detailed description thereof is not necessary herein.

The device 1 according to the invention comprises a main body 2 designed to be attached to the rail by any known anchoring means, as disclosed for example in the document FR-2 893 996 or FR-2 912 993. The anchoring means thus allows a fixed mechanical connection between the main body 2 and the rail.

The device 1 also comprises a connecting member 3 attached to the main body 2 and designed to be connected to the equipment to be installed. The connecting member 3 thus forms a fixation interface between the equipment to be installed (which can be, for example, a block of seats, an on-board galley element, etc.) in the vehicle and the main body 2 that is itself intended to be secured to the rail. As mentioned above, the connecting member 3 is mounted on the main body 2 and is intended to be secured, by any suitable and known means, to the equipment that is desired to be attached to the rail. For example, the equipment in question may be connected by screwing to the connecting member 3, and for example by screwing in threaded holes 17A, 17B provided in the connecting member 3.

The connecting member 3 itself comprises at least a first plate 4 movably mounted on the main body 2. In other words, the first plate 4 is mechanically connected to the main body 2 so as to be permanently integral with the latter, while being capable of moving relative to the main body 2.

Figure 8:
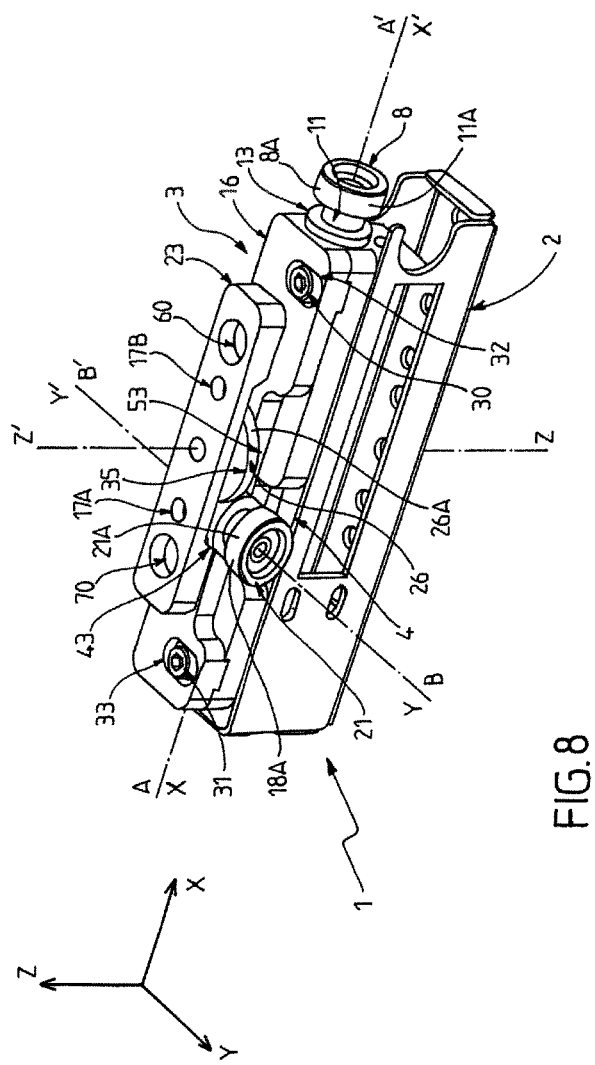
FIG. 8 illustrates, in a schematic perspective view, a device for coupling an equipment to a rail installed on board an aircraft, according to a second embodiment of the invention.

Preferably, the first plate 4 is mounted for translation on the main body 2 according to a first direction X-X' (corresponding to the X-axis of the orthogonal coordinate system illustrated in FIG. 8). The first plate 4 is thus, in this case, slidably mounted, according to the first direction X-X', on the main body 2, so that the first plate 4 can therefore slide on and along the main body 2, in a direction parallel to the first direction X-X'.

To make such a sliding connection between the first plate 4 and the main body 2, it conceivable for example that the first plate 4 is mounted on the main body 2 by means of a holding device (for example, consisting in fixing screws) sliding in at least one opening 14, 15 to allow the displacement of the first plate 4 relative to the main body 2. However, other mechanical assembling modes (dovetail, for example) of the first plate 4 to the main body 2 are also possible as an alternative. It is also quite conceivable that the mechanical connection existing between the main body 2 and the first plate 4 allows more than one degree of freedom, without thereby departing from the scope of the invention.

Preferably, the first direction X-X' is substantially parallel to the direction of longitudinal extension of the rail when the main body 2 is attached to said rail. The first plate 4 is thus, in this case, mounted for longitudinal translation on the main body 2. As a result, the first plate 4 forms a plate for adjustment in the length direction.

The device 1 according to the invention also comprises at least one first adjustment means 8 designed to adjust, through a manipulation of the first adjustment means 8 by a user, the position of the first plate 4 relative to the main body 2. The first adjustment means 8 thus allows a user to vary in a precise and controlled way the position of the first plate 4 relative to the main body 2, and to immobilize the first plate 4 relative to the main body 2 in the position selected by the user.

In other words, the first adjustment means 8 acts to hold the first plate 4 in position relative to the main body 2 with a possibility of progressive and controlled adjustment of this position, such adjustment being operated by the user by direct or indirect manipulation, with or without a tool, of the first adjustment means 8.

The user is thus capable of executing the following sequence of operations:

fixing the device 1 to the rail, with an equipment attached to the connecting member 3 (through threaded holes 17A, 17B);

performing a precise and controlled position adjustment of the first plate 4 relative to the main body 2, by manipulating the first adjustment means 8.

Accordingly, the invention allows a fine position adjustment of the first plate 4, which allows the positioning of the equipment relative to the rail to be perfected.

The first adjustment means 8 may be designed so as to be directly manipulated by the user, without a tool. In this case, which corresponds to the second embodiment of FIG. 8, the first adjustment means 8 comprises a thumbwheel 8A intended to be directly manually operated by a user.

In the first embodiment of FIGS. 1-7, the first adjustment member 8 is designed to be indirectly manipulated by the user, by means of a tool. For example, the first adjustment means 8 comprises in this case a cavity 8B intended to receive the polygonal head of a wrench (for example an hex wrench).

The first adjustment means 8 advantageously comprises a first rotating threaded member 9 cooperating with the first plate 4 to transform the rotational movement of the first threaded member 9 into a movement of the first plate 4, preferably a translational movement of the first plate 4 according to the first direction X-X'.

Figure 4:
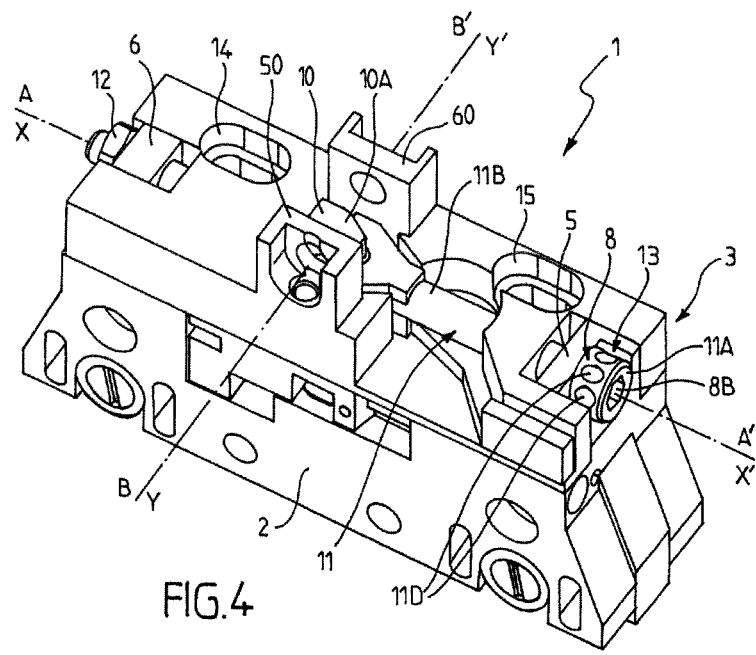
FIG. 4 illustrates, in a schematic perspective view, a design detail of the device of FIGS. 1-3, in which the second and third plates have been omitted, to make visible the assembling structure of the first plate relative to the main body.
Figure 5:
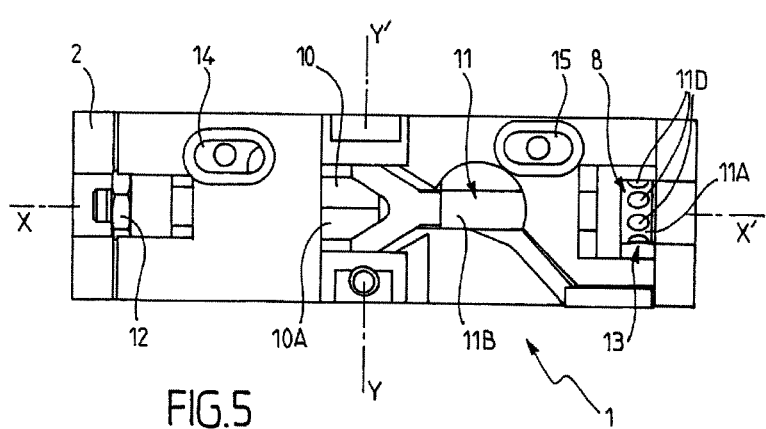
FIG. 5 illustrates, in a top view, the design detail of FIG. 4.
Figure 6:
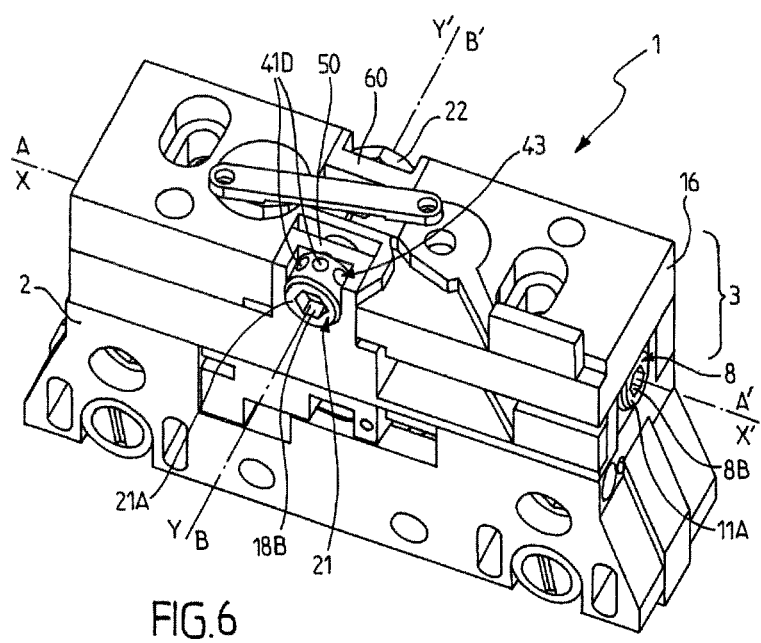
FIG. 6 illustrates, in a schematic perspective view, a design detail of the device of FIGS. 1-5, in which only the third plate have been omitted, to make visible the assembling structure of the second plate relative to the first plate.
Figure 7:
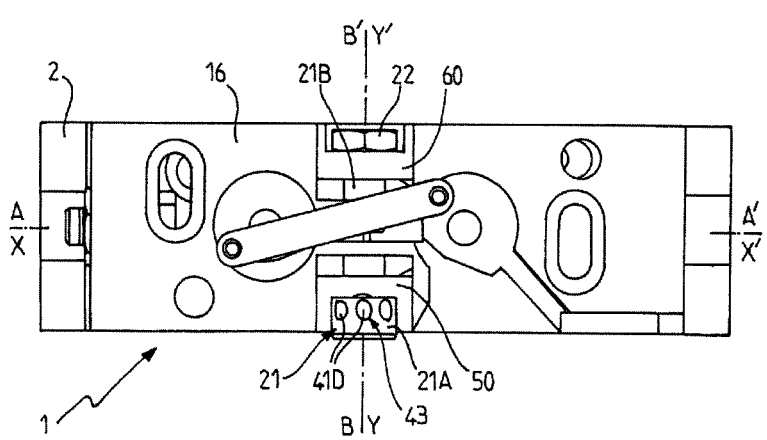
FIG. 7 illustrates, in a top view, the device of FIG. 6.

Preferably, the first threaded member 9 comprises a first adjustment screw 11 mounted for rotation about its longitudinal extension axis A-A' (which is parallel to the axis X-X' in the embodiment illustrated in the drawings), preferably on the main body 2. As illustrated in FIG. 4, the first adjustment screw 11 is advantageously mounted for pure rotation on the main body 2, i.e. it can only rotate on itself, about the axis A-A', and is locked in translation. To that end, the first adjustment screw 11 is, for example, inserted through two stops 5, 6 secured to the main body 2 and respectively arranged at each end of the main body 2 according to the longitudinal direction X-X'. The first adjustment screw 11 can rotate freely in the stops 5, 6, according to a simple pivot connection (the first adjustment screw 11 is not screwed in the stops 5, 6).

The first adjustment screw 11 has preferably a head 11A from which a threaded rod 11B extends longitudinally according to the axis A-A'. The threaded rod 11B thus extends longitudinally between a first end connected to the head 11A and a second, opposite, free end, on which is screwed a nut 12 that, in cooperation with the head 11A and the stops 5, 6, prevents the first adjustment screw 11 from moving in translation according to the axis X-X'. However, the nut 12 is not fully tightened, so as to permit the rotation of the first adjustment screw 11 on itself, around the axis A-A', as exposed above. Of course, the portions of the rod 11B that rotate in the stops 5, 6 are advantageously smooth, so as to permit an easy rotation of the first adjustment screw 11 on itself. As already contemplated above, the head 11A of the first screw 11 is advantageously accessible from the outside of the device 1 and is, for example:

- provided with a polygonal cavity 8B intended to cooperate with a tool (such as an hex wrench) to allow the user to make the first screw 11 rotate around its axis A-A' (embodiment of FIGS. 1-7); or
- provided with a thumbwheel 8A intended to be directly manipulated by the user to make the first screw 11 rotate around its axis A-A' (embodiment of FIG. 8).

To avoid that the angular position of the first adjustment screw 11 around the axis A-A' is awkwardly modified over time, in particular due to the vibrations produced during the displacement of the vehicle, the first threaded member 9 is advantageously provided with a self-locking system 13 that can be of any design know by the one skilled in the art. For example, in the case of the embodiment of FIGS. 1-7, the self-locking system comprises concavities 11D formed in the side of the screw head 11A and intended to cooperate with a ball plunger (not shown) secured to the main body 2. This ball plunger allows the generation of a locking force that, on the one hand, is high enough to prevent the first adjustment screw 11 from rotating accidentally (i.e. excluding any positive action by the user to that end), but that, on the other hand, is low enough so that it can be easily overcame by a user wishing to manually (using an hex wrench, for example) make the first adjustment screw 11 rotate.

Advantageously, the first adjustment means 8 comprises a first passive threaded member 10 secured to the first plate 4 and cooperating with the first rotating threaded member 9 to transform the movement of the latter into a movement of the first plate 4. The use of a cooperation between threaded members to adjust the position of the first plate 4 relative to the main body 2 is particularly interesting in that it permits an extremely progressive and precise adjustment, while permitting, by the effect of friction between the threads, a perfect immobilization of the plate 4 when the first adjustment means 8 is not operated by the user. Advantageously, the first passive threaded member 10 comprises a nut 10A that, on the one hand, is screwed on the first adjustment screw 11 and, on the other hand, is fixedly attached (i.e., in particular, it is locked in rotation and thus can not rotate around the axis A-A') to the first plate 4. As a result, a rotational operation of the first screw 11 through introduction of a tool into the cavity 8B permits the transformation of the rotational movement of the first adjustment screw 11 into a translational movement of the nut 10A and thus of the first plate 4, according to the axis X-X' (which, in this case, is merged with the axis A-A').

Of course, the invention is in no way limited to a movement transforming device of the screw/nut type, even if such a system is preferred because it allows both a position locking of the first plate 4 and a fine position adjustment of the latter to be ensured.

Advantageously, the connecting member 3 further comprises a second plate 16 movably mounted on the first plate 4. Preferably, the second plate 16 is mounted for translation on the first plate 4, according to a second direction Y-Y' (corresponding to the Y-axis of the orthogonal coordinate system illustrated in FIG. 8), which is substantially perpendicular to the first direction X-X'. Advantageously, the first and second directions X-X' and Y-Y' are inscribed in a plan which is substantially parallel to the direction of longitudinal extension of the rail when the main body 2 is attached to the rail. In this case, the first and second plates 4, 16 thus allow a position adjustment of the equipment in the horizontal plane, which allows in particular potential parallax defects of the latter to be corrected. As a result, the second plate 16 forms a plate for adjustment in the width direction, defined by the transverse direction Y-Y'.

Preferably, the second plate 16 is mounted on the first plate 4 in the same manner (but angularly offset by 90° than the first plate 4 is mounted on the main body 2. For example, as can be seen in FIG. 8, the second plate 16 is mounted on the first plate 4 by means of a holding device (comprising for example fixing screws 30, 31) sliding in at least one opening 32, 33 to allow the displacement of the second plate 16 relative to the first plate 4.

Advantageously, the connecting member 3 also comprises a second adjustment means 18 designed to adjust, through a manipulation of the second adjustment means 18 by the user, the position of the second plate 16 relative to the first plate 4. The second adjustment means 18 thus allows a user to vary in a precise and controlled way the position of the second plate 16 relative to the first plate 4, and to immobilize the second plate 16 relative to the first plate 4 in the position selected by the user. In other words, the second adjustment means 18 acts to hold the second plate 16 in position relative to the first plate 4 with a possibility of progressive and controlled adjustment of this position, such adjustment being operated by the user by direct or indirect manipulation, with or without a tool, of the second adjustment means 18.

The principle of operation of the second adjustment means 18 is preferably strictly similar to that of the first adjustment means 8.

Therefore, the second adjustment means 18 advantageously comprises a second rotating threaded member 19 cooperating with the second plate 16 to transform the rotational movement of the second rotating threaded member 19 into a movement of the second plate 16, preferably a translational movement of the second plate 16 according to the second direction Y-Y'. Preferably, the second threaded member 19 comprises a second adjustment screw 21 mounted for rotation about its longitudinal extension axis B-B' (which is parallel to the axis Y-Y' in the embodiment illustrated in the drawings), preferably on the first plate 4. The second adjustment screw 21 is advantageously mounted for pure rotation on the first plate 4, i.e. it can only rotate on itself, about the axis B-B', and is locked in translation. To that end, the second adjustment screw 21 is, for example, inserted through two stops 50, 60 secured to the first plate 4 and respectively arranged at each end of the first plate 4 according to the transverse direction Y-Y'. The second adjustment screw 21 can rotate freely in the stops 50, 60, according to a simple pivot connection (the second adjustment screw 21 is not screwed in the stops 50, 60).

The second adjustment screw 21 has preferably a head 21A from which a threaded rod 21B extends longitudinally according to the axis B-B'. The threaded rod 21B thus extends longitudinally between a first end connected to the head 11A and a second, opposite, free end, on which is screwed a nut 22 that, in cooperation with the head 21A and the stops 50, 60, prevents the second adjustment screw 21 from moving in translation according to the axis Y-Y'. However, the nut 22 is not fully tightened, so as to permit the rotation of the second adjustment screw 21 on itself, around the axis B-B', as exposed above. Of course, the portions of the rod 21B that rotate in the stops 50, 60 are advantageously smooth, so as to permit an easy rotation of the second adjustment screw 21 on itself. As already contemplated above, the head 21A of the second screw 21 is advantageously accessible from the outside of the device 1 and is, for example:

provided with a polygonal cavity 18B intended to cooperate with a tool (such as an hex wrench) to allow the user to make the second screw 21 rotate around its axis B-B' (embodiment of FIGS. 1-7); or provided with a thumbwheel 18A intended to be directly manipulated by the user to make the second screw 21 rotate around its axis B-B' (embodiment of FIG. 8).

To avoid that the angular position of the second adjustment screw 21 around the axis B-B' is awkwardly modified over time, in particular due to the vibrations produced during the displacement of the vehicle, the second threaded member 19 is advantageously provided with a self-locking system 43 that can be of any design know by the one skilled in the art. For example, in the case of the embodiment of FIGS. 1-7, the self-locking system comprises concavities 41D formed in the side of the screw head 21A and intended to cooperate with a ball plunger (not shown) secured to the first plate 4. This ball plunger allows the generation of a locking force that, on the one hand, is high enough to prevent the second adjustment screw 21 from rotating accidentally (i.e. excluding any positive action by the user to that end), but that, on the other hand, is low enough so that it can be easily overcame by a user wishing to manually (using an hex wrench, for example) make the second adjustment screw 21 rotate.

Advantageously, the connecting member 3 further comprises a third plate 23 moveably mounted on the second plate 16. Advantageously, the third plate 23 is designed to be directly fixed to the equipment to be installed, i.e. the third plate 23 acts as a fixation interface between said equipment and the coupling device 1. To that end, the third plate 23 comprises a coupling device, consisting for example, as exposed above, in threaded holes 17A, 17B to fix said equipment, in this case by screwing it in said threaded holes.

Preferably, the third plate 23 is mounted for translation on the second plate 16 according to a third direction Z-Z' (corresponding to the Z-axis of the orthogonal coordinate system illustrated in FIG. 8), which is substantially perpendicular to the first direction X-X' and the second direction Y-Y'. The third plate 23 is thus, in this case, slidably mounted, according to the third direction Z-Z', on the second plate 16, so that the third plate 23 can therefore slide relative to the second plate 16, in a direction parallel to the third direction Z-Z'. As a result, the third plate 23 forms a plate for adjustment in the height direction.

To make such a sliding connection between the third plate 23 and the second plate 16, it conceivable for example that the third plate 23 is mounted on the second plate 16 by means of a holding device (for example, consisting in fixing screws 60, 70) sliding in at least one opening to allow the displacement of the third plate 23 relative to the second plate 16.

Advantageously, the connecting member 3 also comprises a third adjustment means 35 designed to adjust, through a manipulation of the third adjustment means 35 by a user, the position of the third plate 23 relative to the second plate 16. The third adjustment means 35 thus allows a user to vary in a precise and controlled way the position of the third plate 23 relative to the second plate 16, and to immobilize the third plate 23 relative to the second plate 16 in the position selected by the user. In other words, the third adjustment means 35 acts to hold the third plate 23 in position relative to the second plate 16 with a possibility of progressive and controlled adjustment of this position, such adjustment being operated by the user by direct or indirect manipulation, with or without a tool, of the third adjustment means 35.

Advantageously, the third adjustment means 35 comprises a third rotating threaded member 26 cooperating with the third plate 23 to transform the rotational movement of the third threaded member 26 into a translational movement of the third plate 23 according to the third direction Z-Z'. For example, the third rotating threaded member 26 comprises a nut 26A mounted for rotation relative to the second plate 16, said nut 26A cooperating by screwing with a threaded rod 25 secured to the third plate 23 (and fixed with respect to the latter), so as to permit, through a movement transforming system of the screw/nut type, to finely adjust the position of the third plate 23 relative to the second plate 16 by direct or indirect rotational operation, with or without a tool, of the nut 26A.

The nut 26A is advantageously accessible from the outside of the device 1 and forms, for example, a thumbwheel intended to be directly manipulated by the user. To avoid that the angular position of the third adjustment member 26 is awkwardly modified over time, in particular due to the vibrations produced during the displacement of the vehicle, the third threaded member 26 is advantageously provided with a self-locking system 53 that can be of any design know by the one skilled in the art.

Therefore, the unit formed by the main body 2 and the connecting member 3 (which incorporates the three plates 4, 16, 23) advantageously forms a device of level adjustment by translation in the three axis x, y and z and of correction of parallax defects of an equipment intended to be fastly and removably fixed to fixation rails located in some place that can be an aircraft.

Figure 1:
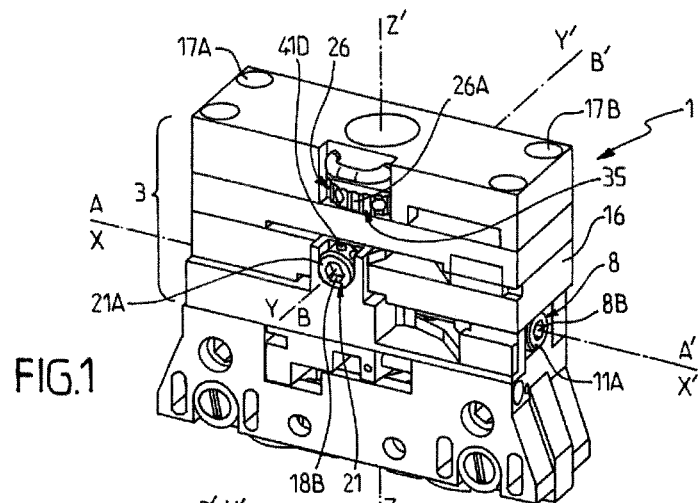
FIG. 1 illustrates, in a schematic perspective view, a device for coupling an equipment to a rail installed on board an aircraft, according to a first embodiment of the invention, said device being provided with a connecting member comprising three plates mounted for translation relative to each other, each according to a different direction perpendicular to the two other directions.
Figure 2:
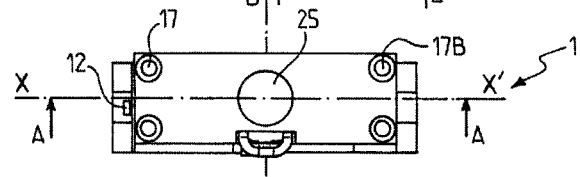
FIG. 2 illustrates, in a top view, the device of FIG. 1.
Figure 3:
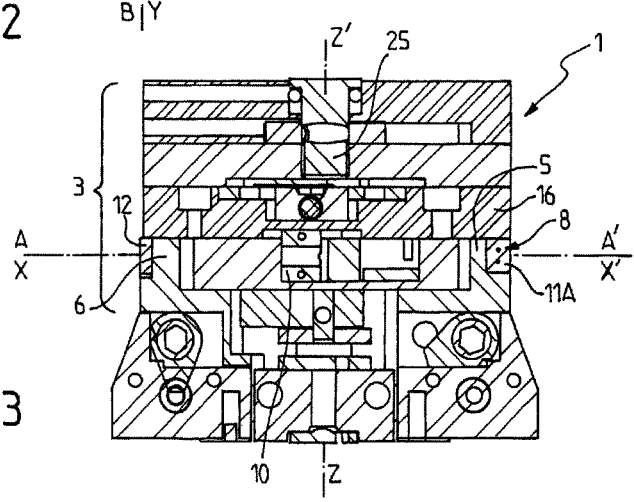
FIG. 3 illustrates, in a cross-sectional view, according to the line A-A of FIG. 2, the device shown in FIGS. 1 and 2.

The following description relates more precisely to the embodiment of FIG. 8, but remains for the essential applicable to the embodiment of FIG. 1.

The device 1 comprises a set of three adjustment plates 4, 16, 23:
- a plate 4 for the adjustment in the length direction;
- a plate 16 for the adjustment in the width direction;
- a plate 23 for the adjustment in the height direction.

The plates 4, 16, 23 can slide relative to each other and are connected to each other by fixation screws, which can themselves slide along the three axes in openings and in holes allowing the translational guiding of the plates and the holding of the plates together. The adjustment along the three axes is made by means of adjustment thumbwheels provided with a self-locking system to avoid a change of adjustment of the axes. The plate for adjustment in the length direction slides longitudinally in an opening. This plate is held in the desired position by means of an adjustment screw, which can be a thumbwheel provided with a self-locking system to avoid a change of adjustment of the axis. The plate for adjustment in the width direction slides laterally in an opening. This plate is held in the desired position by means of an adjustment screw, which can be a thumbwheel provided with a self locking system to avoid a change of adjustment of the axis. The plate for adjustment in the height direction slides upwardly or downwardly in an opening. This plate is held in the desired position by means of an adjustment screw, which can be a thumbwheel provided with a self-locking system to avoid a change of adjustment of the axis. These three adjustment plates are held together by holding devices, which can be screws. The adjustments of the plates in the length, width and height directions can be performed under load and without any tool. On the one hand, the set of three adjustment plates is connected to the equipment to be fixed in aircraft-rails, for example by means of assembling devices. On the other hand, the set of three adjustment plates can be fixed to a fixation device in a rail, which can be a device for the coupling to a rail installed on board a vehicle and a corresponding system, that are the subject matter of the invention filed under the number Ser. No. 07/01318 in the name of the same applicant, by means of screws for example. Therefore, the device 1 comprises a plate for adjustment in the length direction 4, held on a plate for adjustment in the width direction 16, held on a plate for adjustment in the height direction 23, by means of shoulder screws 30, 31, 60, 70. Each adjustment plate 4, 16, 23 sliding in openings 32, 33 is adjustable on an axis x, y or z by means of adjustment thumbwheels (provided on the threaded members 9, 19, 26), provided with a self-locking system 13, 43, 53 thus allowing to correct simultaneously the translation levels and the parallax defects of the equipment to be fixed in the rails located in some place that can be an aircraft. The set of three adjustment plates 4, 16, 23 is fixed by means of screws on a coupling device (corresponding to the main body 2) to a fixation rail. The set of three adjustment plates 4, 16, 23 is assembled to the equipment to be fixed in aircraft-rails by means of threaded holes 17A, 17B.

Possibilities of Industrial Application

The invention finds industrial application in design, manufacturing and use of coupling devices.

The invention claimed is:

1. A device (1) for coupling an equipment to a rail installed on board a vehicle, said device (I) comprising a main body (2) designed to be attached to the rail, and a connecting member (3) attached to the main body (2) and designed to be connected to said equipment, said device (1) being characterized in that the connecting member (3) comprises at least a first plate (4) movably mounted on the main body (2), and a first adjustment means (8) designed to adjust, through a manipulation of the first adjustment means (8) by a user, the position of the first plate (4) relative to the main body (2),
characterized in that said first plate (4) is mounted for translation on the main body (2) according to a first direction (X-X'), and
characterized in that said rail extends longitudinally along a direction of longitudinal extension, the first direction (X-X') is substantially parallel to the direction of longitudinal extension of the rail when the main body (2) is attached to said rail.

2. The device (1) according to claim 1, characterized in that the first adjustment means (8) comprises a first rotating threaded member (9) cooperating with the first plate (4) to transform the rotational movement of the first threaded member (9) into a translational movement of the first plate (4) according to the first direction (X-X').

3. The device (1) according to claim 2, characterized in that the first threaded member (9) is provided with a self-locking system (13).

4. The device (1) according to claim 1, characterized in that the first plate (4) is mounted on the main body (2) by means of a holding device sliding in at least one opening to allow the displacement of the first plate (4) relative to the main body (2).

5. A device (1) for coupling an equipment to a rail installed on board a vehicle, said device (I) comprising a main body (2) designed to be attached to the rail, and a connecting member (3) attached to the main body (2) and designed to be connected to said equipment, said device (1) being characterized in that the connecting member (3) comprises at least a first plate (4) movably mounted on the main body (2), and a first adjustment means (8) designed to adjust, through a manipulation of the first adjustment means (8) by a user, the position of the first plate (4) relative to the main body (2),
characterized in that the connecting member (3) comprises a second plate (16) movably mounted on the first plate (4), and a second adjustment means (18) designed to adjust, through a manipulation of the second adjustment means (18) by a user, the position of the second plate (16) relative to the first plate (4).

6. The device (1) according to claim 5, characterized in that said first plate (4) is mounted for translation on the main body (2) according to a first direction (X-X'), and said second plate (16) is mounted for translation on the first plate (1) according to a second direction (Y-Y'), which is substantially perpendicular to the first direction (X-X').

7. The device (1) according to claim 6, characterized in that the second adjustment means (18) comprises a rotating threaded member (19) cooperating with the second plate (16) to transform the rotational movement of the threaded member (19) into a translational movement of the second plate (16) according to the second direction (Y-Y').

8. The device (1) according to claim 7, characterized in that the threaded member (19) is provided with a self-locking system (43).

9. The device (1) according claim 5, characterized in that the second plate (16) is mounted on the first plate (4) by means of a holding device (30, 31) sliding in at least one opening (32, 33) to allow the displacement of the second plate (16) relative to the first plate (4).

10. The device (1) according to claim 5, characterized in that the connecting member (3) comprises a third plate (23) moveably mounted on the second plate (16), and a third adjustment means (35) designed to adjust, through a manipulation of the third adjustment means (35) by a user, the position of the third plate (23) relative to the second plate (16).

11. The device (1) according to claim 10, characterized in that said first plate (4) is mounted for translation on the main body (2) according to a first direction (X-X'), said second plate (16) is mounted for translation on the first plate (1) according to a second direction (Y-Y'), and the third plate (23) is mounted for translation on the second plate (16) according to a third direction (Z-Z'), which is substantially perpendicular to the first direction (X-X') and the second direction (Y-Y').

12. The device (1) according to claim 11, characterized in that the third adjustment means (35) comprises a rotating threaded member (26) cooperating with the third plate (23) to transform the rotational movement of the threaded member (26) into a translational movement of the third plate (23) according to the third direction (Z-Z').

13. The device (1) according to claim 12, characterized in that the threaded member (26) is provided with a self-locking system (53).

14. The device (1) according to claim 10, characterized in that the third plate (23) is mounted on the second plate (16) by means of a holding device (60, 70) sliding in at least one opening to allow the displacement of the third plate (23) relative to the second plate (16).

15. The device (1) according to claim 10, characterized in that the third plate (23) comprises an assembling device (17A, 178) for fixing said equipment.

16. The device (1) according to claim 1, characterized in that it is a device (1) for coupling an equipment to a rail on-board an aircraft.

17. The device (1) according to claim 4, characterized in that the connecting member (3) comprises a second plate (16) movably mounted on the first plate (4), and a second adjustment means (18) designed to adjust, through a manipulation of the second adjustment means (18) by a user, the position of the second plate (16) relative to the first plate (4).

18. The device (1) according to claim 8, characterized in that the second plate (16) is mounted on the first plate (4) by means of a holding device (30, 31) sliding in at least one opening (32, 33) to allow the displacement of the second plate (16) relative to the first plate (4).

* * * * *